May 6, 1941.  C. H. BABB ET AL  2,240,747
AIRCRAFT
Filed May 12, 1939
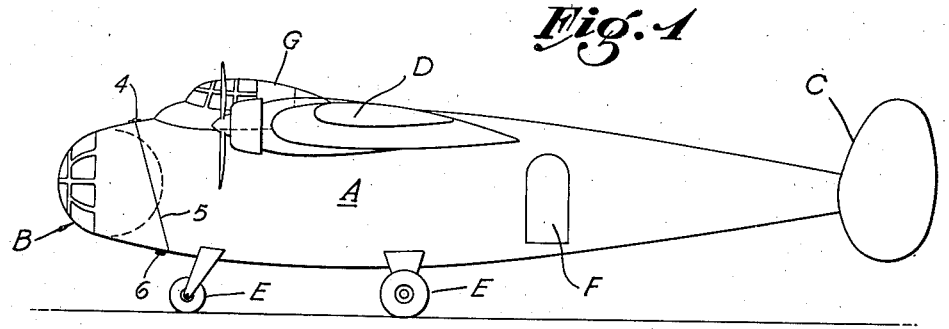
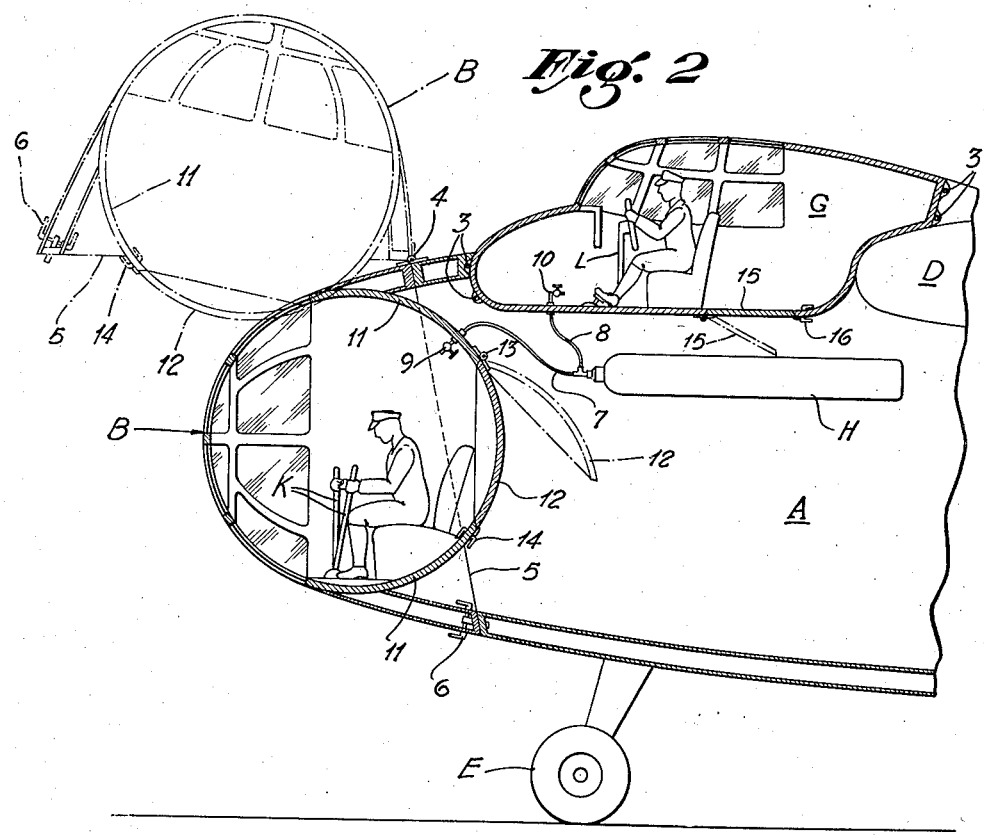
CHARLES H. BABB and
JOSEF S. J. HLOBIL,
INVENTORS;
BY
ATTORNEY.

Patented May 6, 1941

2,240,747

UNITED STATES PATENT OFFICE 2,240,747

AIRCRAFT

Charles H. Babb, Los Angeles, and Josef S. J. Hlobil, Beverly Hills, Calif.

Application May 12, 1939, Serial No. 273,244

3 Claims. (Cl. 244—1)

This invention relates to aircraft, and more particularly to heavier than air flying machines; and it has for its objects to provide improvements in such flying craft as shall adapt the same to varying conditions of use and service and for ready alteration or modification or substitution of make-up for different classes of service or use, military, photographic, commercial or otherwise. The invention has for further objects the provision of improvements in aircraft of the character mentioned which may be utilized as desired in very high altitudes and which will be generally superior with respect to inexpensiveness and durability and reliability of construction and make-up, taken conjointly with facility of alteration or modification with respect to type or provision of particular features or groups of equipment, and which will be generally superior in serviceability.

With the above and other objects in view, the invention consists in the novel provision, formation, inter-relation, combination and association of parts, members and features and adaptability of same to variations in make-up and arrangement, and in the features and provisions looking to the latter ends, all as hereinafter described, shown in the drawing, and finally pointed out in claims.

In the drawing:

Fig. 1 is a side elevation of aircraft constructed and organized to embody the invention in one kind or character of practice thereof; and Fig. 2 is an enlarged, partial, vertical, longitudinal section thereof, taken approximately upon the longitudinal axis thereof, and illustrating one mode of utilization of the aircraft.

Corresponding parts in both figures are designated by the same reference characters.

Referring with particularity to the drawing, we have shown at A the body or fuselage of a flying machine having a nose portion B and a tail portion C, a wing structure D for sustentation of the craft in flight. Conventional landing gear is shown at E. Also, at F is shown a door for providing access to the interior of the body or fuselage. G designates a pilot's compartment detachably connected with the fuselage A by bolts or other fastening devices 3, the particular nature of which is not concerned in the invention, and the nose portion B is detachably and hingedly mounted by suitable hinge means 4 at the upper portion thereof, whereby the nose portion may be removed along a line 5 preferably oblique with respect to the longitudinal major axis of the fuselage; and locking means 6 are provided at the lower portion of the nose portion B for releasably holding the hinged nose portion in closed position with respect to the fuselage. The particular nature of the detachable hinge means or hinge means permitting detachment of the nose portion, 4, and of the locking means 6 are not concerned in the invention. This detachable nose portion hingedly mounted and readily removed for substitution and capable of being locked or unlocked both inside and outside, may be of varying types, among which may be mentioned units for bombing, for gunnery, for a pilot's compartment, for a photographer and for an observer for exploration. The detachable compartment G may be of varying types, one of which may be substituted for others, and suitably equipped with instruments and otherwise, so as to be adapted for commercial or military or other use. The provision of these detachable compartments B and G widely diversifies the uses to which the aircraft so equipped may be put, giving it a flexibility of service meeting many ends and requirements and demands or preferences, so that a single ship or aircraft unit may be quickly altered from one general type to another by mere change or substitution or alteration with respect to the compartments or either of same. Likewise, for particular purposes, as for flying in high altitudes, the compartments B and G may be so jointed and sealed as to be airtight, so that a suitable pressure medium or suitable medium for respiration or assisting respiration of the occupants of the compartments may be served or supplied to either or both of said compartments, as from a pressure tank or receiver H containing oxygen or the like. However, in this instance, there is no pressureizing or oxygenation of the entire fuselage or craft, but only of the compartment B or compartment G, or both, and the remainder of the ship may be kept at normal pressure or minus pressure, thus concentrating the pressureizing or oxygenation or the like upon the particular interiors, of relatively smaller dimensions or cubical contents, which are occupied in the use and operation of the ship. This tank or receiver H may communicate with the compartment B by a pipe 7, and may similarly communicate with compartment G by a pipe 8, nozzles or valves 9 and 10 being provided within the respective compartments for controlling the supply of pressure medium or the like. Preferably in one preferred form, the compartment B may be formed to assume a generally spherical form by wall structure 11, as shown in Fig. 2, for better withstanding variations in atmospheric pressure, this generally spherical wall structure being built into the nose portion B as clearly shown in Fig. 2, the nose portion B being shown as raised by the hinged means 4, in open position, in dotted lines in Fig. 2, permitting access to the interior of the fuselage, and said wall structure 11 is preferably provided with a door portion 12, hinged to the main wall structure as at 13, and provided with releasable locking means 14, similar to the locking means 6, for holding the door member in closed position and which likewise can be operated either from within or without the wall structure 11.

A door 15 may likewise be provided for the pilot's compartment G, as at the lower portion thereof, leading to any suitable steps or means of descent within the fuselage, although same are not shown or essential to the invention; and releasable locking means 16 similar to those heretofore mentioned may be provided for said door and operable both within or without the compartment.

Of course, the compartments B and G may be used without pressureizing or the supply thereto of any medium from the tank or receiver such as H as in the case of operation at relatively low altitudes.

The operation, method of use and advantages of the invention will be obvious and apparent from the foregoing description without any further particular statement thereof. It is obvious that various kinds of compartments B and G may be employed for substitution for different kinds of services. In Fig. 2 we have shown the figure of a man operating controls K which may in turn control the releasing of bombs for military bombing or may control the firing of guns of various types. In the compartment G we have shown the figure of a man seated behind and operating controls L for the operation and navigation of the craft.

It is obvious that very many changes and modifications and alterations and substitutions and variations may be made with respect to the foregoing description and the accompanying drawing in adapting the invention to varying conditions of use and service, without departing from the true spirit of the invention.

Having thus disclosed our invention, we claim to secure by Letters Patent:

1. An aircraft, including in combination, a fuselage adapted for standard flight requirements and having a plurality of openings, compartment units for human occupancy removably fitted to said openings for the purpose of adapting the craft to special flight requirements, said compartment units each having an entrance door and constructed to withstand high pressures from within and without, and means for supplying a gaseous medium under pressure to said compartment units.

2. An aircraft, including in combination, a fuselage adapted for standard flight requirements and having the front end formed with an open frame, a nose unit including a spherical compartment having an entrance door affording access to the body of the fuselage, the exterior of said spherical compartment being provided with a substantially conical rearwardly extending wall portion whose rear end abuts said frame, means for releasably securing the rear end of said wall portion of the nose unit to the frame, and means for supplying a gaseous medium under pressure to said spherical compartment when the same is sealed by closing the door thereto.

3. An aircraft, including in combination, a fuselage adapted for standard flight requirements and having its upper side formed with a seat, a compartment unit constructed to withstand high pressures from within and without removably fitted to said seat and having a door in its bottom wall communicating with the fuselage, and means for supplying a gaseous medium under pressure to said compartment when the same is sealed by closing said door.

CHARLES H. BABB.
JOSEF S. J. HLOBIL.